G. A. EVANS ET AL 3,033,321

HYDRAULIC DYNAMOMETERS

Filed May 5, 1958

INVENTORS
GODFREY A. EVANS +
WILLIAM N. BATHURST
BY
Holcombe, Wetherill & Brisebois
ATTORNEYS

FIG. 6.

United States Patent Office 3,033,321
Patented May 8, 1962

3,033,321
HYDRAULIC DYNAMOMETERS
Godfrey Arthur Evans, Malvern, and William Nevile Bathurst, Worcester, England, assignors to Heenan & Froude Limited, Worcester, England, a company of Great Britain
Filed May 5, 1958, Ser. No. 733,187
Claims priority, application Great Britain May 9, 1957
6 Claims. (Cl. 188—90)

The present invention relates to hydraulic dynamometers, and has for an object to provide an improved back pressure valve and control system for a hydraulic dynamometer.

In the known hydraulic dynamometers the back pressure valve hitherto provided imposes a speed-load relationship which follows a natural cube law or propeller law characteristic curve so that for a given setting of the back pressure valve the power absorbed rises approximately as the cube of the speed. The characteristic curve for each setting of the back pressure valve likewise follows the same cube law, and the behaviour of the dynamometer can be shown diagrammatically by a family of curves within the envelope of total capacity of the dynamometer, each of the curves following a cube law.

There are, however, certain test requirements under which it is desirable to impart to the dynamometer what may be termed a "constant speeding characteristic curve" by means of which the rotational speed of a prime mover connected to the dynamometer can be maintained substantially constant at a predetermined value, irrespective of the power developed by the prime mover. Thus, for a given setting of the back pressure valve the power absorbed by the dynamometer, as the prime mover is accelerated up to a predetermined speed, is very small, but upon the speed rising above the predetermined value the dynamometer absorption is caused to rise very rapidly and only a very small speed increase is required for the load of the dynamometer to build up from a small to a high value. In this sense the dynamometer then possesses a very steeply rising characteristic curve.

There are, in addition, requirements under which it may be necessary to impose during acceleration of a prime mover a predetermined propeller law characteristic curve, and during the process of the acceleration period to change to the steeply rising characteristic curve referred to above. The rotational speed at which the change from the first characteristic to the second takes place must be capable of selection by some suitable form of control.

As will be inferred from the foregoing, the term "constant speed" may be taken to mean either true constant speed or a reasonably close approximation to it, namely, a steeply rising load for a relatively small increment of speed. A further desirable test requirement is to be able to vary the steepness or slope of the aforementioned constant speeding characteristic curve.

The present invention is directed to providing a back pressure valve and control system for an hydraulic dynamometer capable of controlling operation of the hydraulic dynamometer so as to give a propeller law characteristic followed upon rising speed, by a superimposed constant speed characteristic, and according to the invention an hydraulic dynamometer is provided with a back pressure valve and means responsive to the dynamometer speed for controlling the actuation of the valve so that up to a selected predetermined speed the valve is effective to cause variable back pressure such that the dynamometer follows a propeller law characteristic according to the load required, and upon the dynamometer exceeding the said predetermined speed the valve causes the back pressure to build up rapidly thereby to cause a rapid rise in dynamometer absorption to maintain the speed substantially constant irrespective of the power developed by the prime mover driving the dynamo.

According to a further feature of the invention, the said speed responsive means is operable by pressure fluid supplied from one or more sources of pressure—hereinafter referred to as the signal pressure or pressures—which is or are immediately responsive to the dynamometer speed, the said pressure or pressures preferably varying as the square of the said speed. Convenienlty, the signal pressure or pressures is or are derived from a disc pressure generator, but other suitable types of fluid pump such as positive displacement or gear type pumps driven directly or indirectly from the dynamometer main shaft or driven at a speed which is proportional to the speed of the dynamometer main shaft may be employed to provide the signal pressure.

According to a still further feature of the invention, the said speed responsive means is selectively operable to permit the dynamometer to operate on a constant speed characteristic, or on a propeller law characteristic.

According to a yet still further feature of the invention, a means is provided for varying the steepness or slope of the constant speed characteristic curve.

The invention will now be described with reference to the accompanying drawings, in which.

Figure 1:
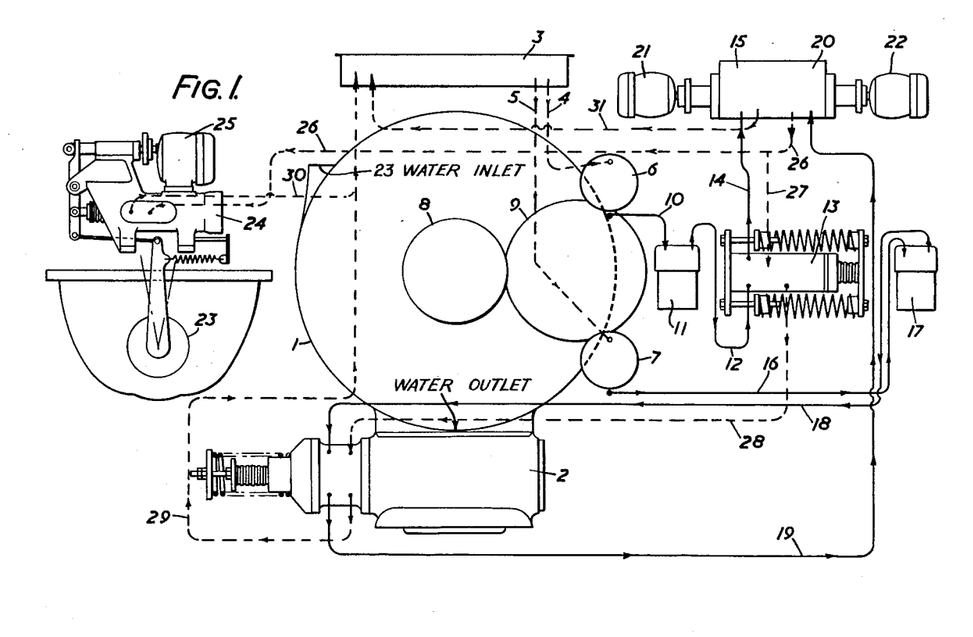
FIGURE 1 represents diagrammatically one embodiment of the invention and shows a dynamometer provided with a back pressure valve and the associated pressure fluid control means and their connections.

Referring firstly to FIGURE 1, there is represented diagrammatically at 1 a dynamometer provided with a back pressure valve assembly 2 connected to the discharge outlet of the dynamometer. Control of the back pressure valve and associated control means is effected by oil pressure and for this purpose there is an oil tank 3 from which oil is fed through pipes 4 and 5 to the suction side of pumps 6 and 7 respectively. The pumps 6 and 7 are driven directly from the dynamometer shaft through gears shown diagrammatically at 8 and 9 and are preferably of the gear or positive displacement type capable of delivering oil in a quantity directly proportional to their speed and therefore developing a pressure against a fixed resistance, which pressure varies as the square of the pump speed.

The pump 6, although driven from the dynamometer shaft and therefore having a speed proportional to the speed of the dynamometer, will hereinafter be referred to as the constant speed pump, and delivers oil under pressure through pipe 10, filter 11, and pipe 12 to a constant speed valve 13 and from thence through a pipe 14 to a constant speed needle valve 15.

The pump 7, hereinafter referred to as the propeller law pump, delivers oil under pressure through pipe 16, filter 17 and pipe 18 to the back pressure valve 2 and then through pipe 19 to a propeller law needle valve 20. Adjustment of the constant speed and propeller law needle valves 15 and 16 is effected by electric motors 21 and 22 respectively, controlled by suitable manually operable switches (not shown) as will hereinafter be more fully described.

The dynamometer is also provided with a rotary valve 23 controlling the inlet of water to the dynamometer casing, the valve 23 being operatively connected to a control apparatus 24 and driving motor 25, the control apparatus 24 being operated—as will hereinafter be described—by oil pressure supplied through a pipe 26 from the outlet of the propeller law needle valve 20, which outlet is also connected through a pipe 27 to the constant speed valve 13 which itself is connected to the back pressure valve 2 by an oil-return pipe 28.

Oil is returned to the oil tank 3 from the back pressure valve 2 and from the inlet valve control apparatus 24 through return pipes 29 and 30 respectively, and from the constant speed needle valve 15 through a return pipe 31.

The dynamometer and associated control apparatus has thus far been described in general terms and the operation of the dynamometer under varying conditions will become apparent from the following more detailed description of the dynamometer components associated therewith as shown in detail in FIGURES 1A to 5, respectively.

Figure 1A:
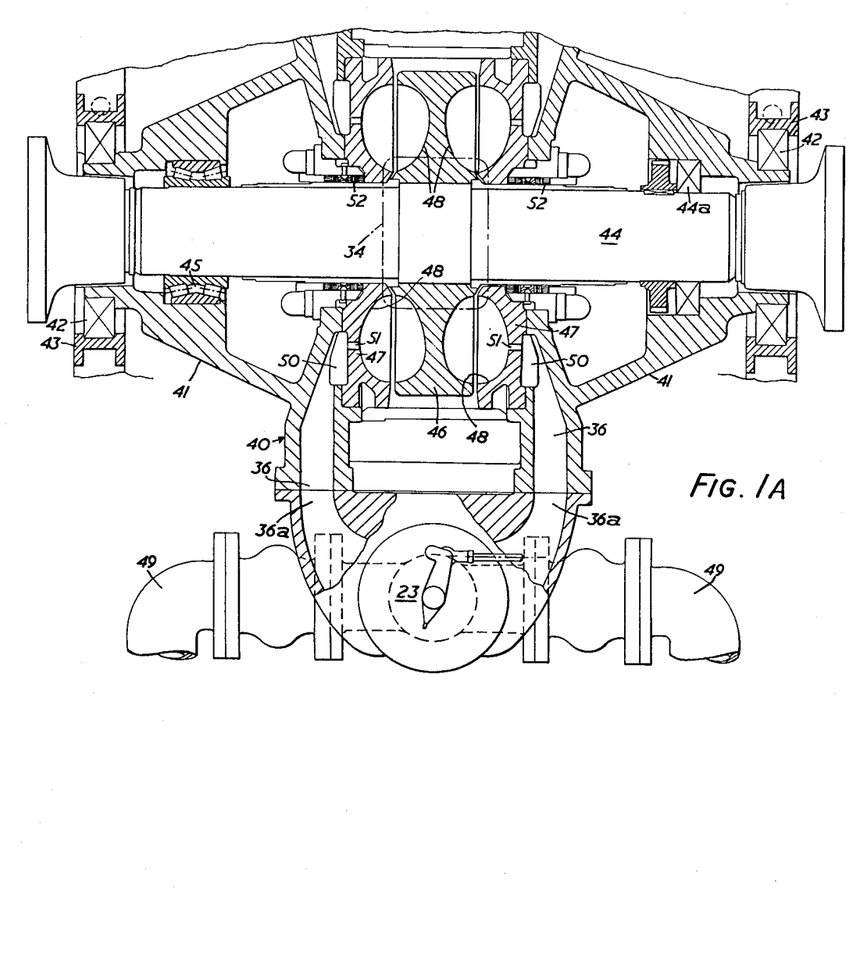
FIGURE 1A is a partial plan view of the dynamometer of FIGURE 1 showing parts in section and parts broken away.

As will be seen from FIGURE 1A, the dynamometer diagrammatically shown at 1 in FIGURE 1 comprises a closed casing indicated generally at 40 and having elongated end portions 41 supported by bearings 42 in trunnions 43. A shaft 44 extends through the casing 40 and is rotatably supported therein adjacent each end by bearings 44a and 45 respectively, the bearing 45 being a thrust bearing acting to position the shaft 44 longitudinally with respect to the casing. A rotor 46 is secured to the shaft 44 intermediate the length thereof for rotation between a pair of half stators 47 secured in the casing 40. The opposing faces of the rotor and half stators are provided with recesses or cups 48 which cooperate to absorb power when water is supplied to the cups of the half stators. The water is supplied to the casing through two inlet pipes 49 connected to the control valve 23, hereinafter to be more fully described, which controls the flow of water from the inlet pipes 49 through the valve 23 and inlet ducts 36 in the casing 40 to an annular channel 50 at the back of each half stator 47. From the annular channel 50, the water flows through ducts 51 extending into each of the cups 48 of the respective half stators. Sealing glands 52 surround the shaft 44 at each side of the assembly of rotor 46 and half stators 47 and the water supplied to the cups 48 through the ducts 51 is discharged from the casing 40 through an outlet opening 34 provided in the bottom of the casing 40 and to which is connected the back pressure valve 2, as will hereinafter be more fully described.

Figure 2:
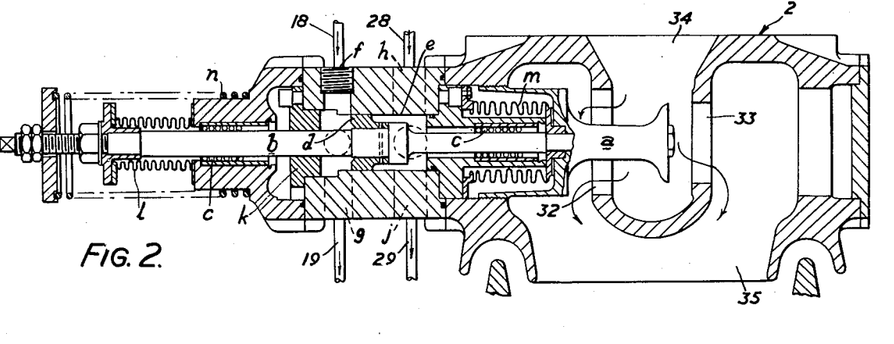
FIGURE 2 is a sectional elevation of the back pressure valve of FIGURE 1.

As shown in FIGURE 2, the back pressure valve 2 comprises a double mushroom valve member $a$ directly mounted on a spindle $b$ carried in axial ball bearings $c$ between which is positioned a piston $d$ secured to the spindle $b$ and moving within a cylinder $e$. The respective end faces of the double mushroom member are adapted to co-operate with ports 32 and 33 to close the ports and axial displacement of the spindle $b$ in a direction from left to right as viewed in FIG. 2 causes the valve member to move from the normal open position shown in FIG. 2 towards the closed position. The ports 32 and 33 are arranged so that all water leaving the outlet 34 of the dynamometer casing passes through the ports 32 and 33 to a discharge 35. High pressure oil from the propeller law pump 7 and supplied through pipe 18 enters at port $f$ and leaves at port $g$ and this oil pressure acting on one side of the piston $d$ forces the outer mushroom valve member in a direction to close the ports 32 and 33 to restrict the discharge of the water through the outlet 34, thereby applying back pressure to the water in the casing 40. Low pressure oil returning from the constant speed valve 13 to the oil tank 3 also passes through cylinder $e$ on the opposite side of the piston $d$ through pipe 28, ports $h$ and $j$, and pipe 29 in order to keep control pressure oil in movement on both sides of the piston $d$.

Leakage oil through the end cover $k$ of the cylinder $e$ is returned through a port (not shown) to the low pressure part of the system and external leakage is positively prevented by two flexible metallic bellows $l$ and $m$ surrounding each end of the spindle $b$. A light adjustable compression spring $n$ loads the spindle $b$ in a direction to hold the valve member in the open position under minimum load conditions and to compensate for small and irreducible pressure differential across the piston which would tend to move the valve member in the closing direction.

The water inlet valve 23 and associated control apparatus 24 (FIGURE 3) comprises a body $g_1$ supporting a rotary valve in the form of a hollow cylindrical member $a_1$ to the interior of which water is supplied from the inlet pipes 49 (FIGURE 1A). The wall of the cylindrical member $a_1$ is provided with four ports $q_1$ for controlling the flow of water from the interior of the cylindrical member $a_1$ through ducts 36a in the body $g_1$ to the inlet ducts 36 of the dynamometer casing 40. A lever $b_1$ is secured to the member $a_1$ for effecting rotation thereof to control the flow of water into the casing 40 and is linked at its outer end to a second lever $c_1$ rocking on a fulcrum $d_1$. Rotation of the motor 25 is controlled by suitable manually operable switches (not shown) and it is provided with limit switches and a position indicator (not shown) and when rotated in one direction drives through a suitable screw mechanism 37 to pull the upper end of lever $c_1$ towards it, thus opening the valve against the tension of a spring $f_1$. When the motor 25 is rotated in the opposite direction the spring $f_1$ returns the valve to the closed position. This mechanism therefore provides a convenient and compact method of controlling from a remote point by motorised drive the angular position of the valve member $a_1$ and thereby the flow of water into the dynamometer. The water inlet valve body $g_1$ is placed at the side of the dynamometer casing and the ducts 36a are made such that the flow of water entering the dynamometer is equally divided between the inlet ducts 36 of the casing 40.

Figure 3:
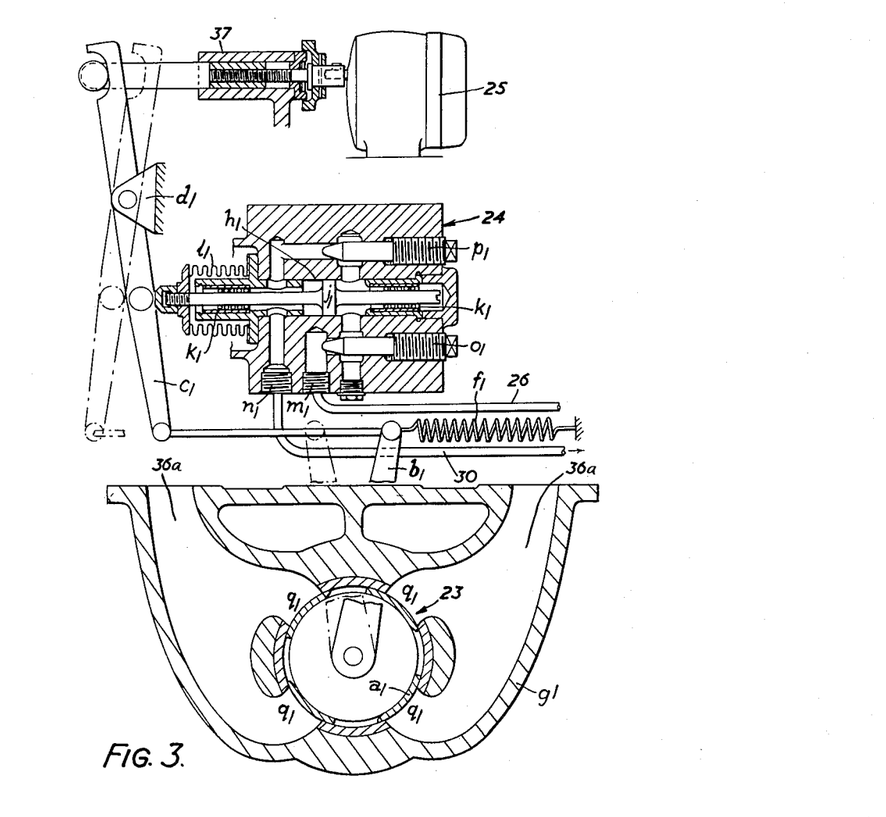
FIGURE 3 is a sectional elevation of the rotary inlet valve and associated control apparatus.

A means is provided for automatically opening the inlet valve under certain conditions to a greater extent than the setting previously determined by the motor 25. Thus a cylinder $h_1$ has sliding within it a piston and piston rod $j_1$, the free end of which presses on the lever $c_1$ so as to override the motor and open the rotary valve wider against the tension of spring $f_1$. The piston rod is mounted in two axial ball bearings $k_1$ and sealed with a flexible bellows $l_1$. High pressure oil enters from pipe 26 to port $m_1$ and leaves as low pressure oil through port $n_1$ to pipe 30. Two hand adjusted needle valves $o_1$ and $p_1$ regulate the response rate and the actual rate of increase of oil pressure available against the piston $j_1$.

It will be appreciated therefore that this valve serves a dual function; firstly as a means for presetting the water inflow rate at a desired value from a maximum to a minimum, and secondly, when a pressure signal is received from the control circuit, for automatically increasing the rate of water inflow above the initial pre-set amount.

The oil tank 3 is mounted at the highest point in the oil pressure system so that all pipes and passages are permanently full of oil under a small pressure head due to the height of the tank, and the pumps 6 and 7 always remain primed. The tank 3 may be of any convenient form and may be provided with suitable means (not shown) for heating or cooling the control system oil to stabilise its temperature. It will usually be desirable to have provision for indicating the head of oil in the tank together with a strainer and breather to maintain atmospheric pressure at the oil surface.

The constant speed needle valve 15 (FIGURE 4) comprises a needle or plunger $a_4$ engaged in screw threaded relation in the bore $b_9$ of an end cap $b_7$ secured to a ported cylinder $b_4$ in which plunger $a_4$ is positioned. The motor 21 is mounted on the end of the cap $b_7$ and has a square section shaft $s_4$ which slidingly engages in a square aperture in the plunger $a_4$. Rotation of the shaft $s_4$ thus imparts helical movement of the plunger $a_4$, i.e. the plunger is rotated and at the same time is moved longitudinally of the cylinder $b_4$ due to its screw threaded engagement with the end cap $b_7$. Thus, upon rotation of the motor 21 the port of the cylinder $b_4$ is opened or closed to a desired extent. The motor is provided with limit switches and position indicator (not shown) to enable it to be operated from a remote point. The ported cylinder is carried in a valve body $d_4$ having an inlet passage $e_4$ for high pressure oil delivered through pipe 14 from the constant speed valve 13. There is also an outlet passage $f_4$ for low pressure oil to return to the oil supply tank through pipe 31. External oil leakage is prevented by double O rings $g_4$ and as a safeguard against excessive oil pressure a spring-loaded ball $h_4$ lifts off its seat and relieves from the high pressure to the low pressure side of the valve.

Figure 4:
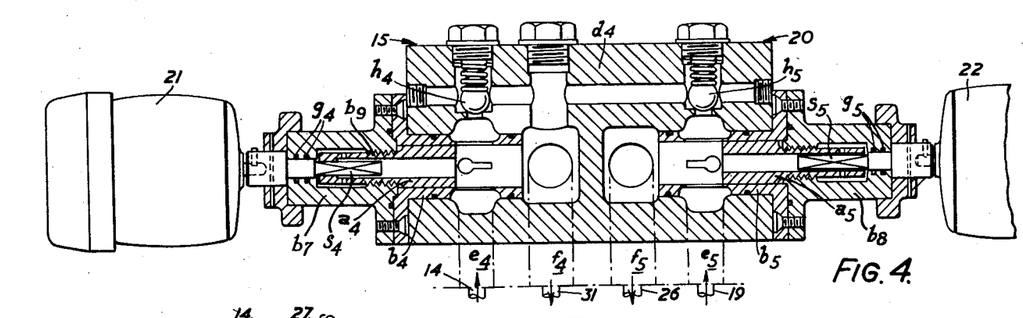
FIGURE 4 is a sectional elevation of the needle valves for controlling operation of the dynamometer on a constant speed and a propeller law characteristic respectively.
Figure 5:
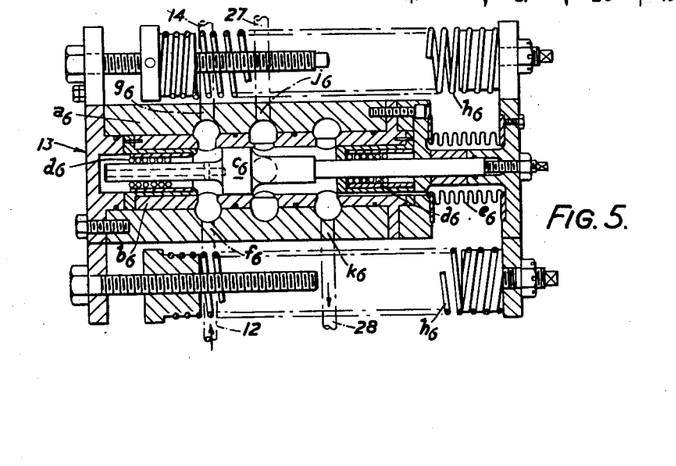
FIGURE 5 is a sectional elevation of the constant speed valve of FIGURE 1.

The propeller law needle valve 20 is of similar construction to the constant speed needle valve 15 and is carried in the same valve body $d_4$ but with separate plunger or needle $a_5$, ported cylinder $b_5$, end cap $b_8$, motor 22, shaft $s_5$ and valve body inlet and outlet passages $e_5$ and $f_5$. There is also a ball relief valve $h_5$ and double sealing O rings $g_5$ as in the case of the needle valve 15.

The constant speed control valve 13 (FIGURE 5) comprises a valve body $a_6$ lined with a ported sleeve $b_6$. Within this sleeve a piston and piston rod $c_6$ is free to move longitudinally being mounted on axial type ball bearings $d_6$. Any oil leakage from the low pressure area is prevented by a flexible metallic bellows $e_6$ surrounding the free end of the piston rod. High pressure oil enters from pipe 12 through passage $f_6$ leaving through passage $g_6$ and pipe 14, so that the resulting force due to pressure generated on the left hand side (as viewed in FIGURE 5) of the piston moves it to the right against the tension of the two adjustable springs $h_6$. The piston in travelling to the right progressively cuts off the flow of oil entering from pipe 27 and through passage $j_6$ and leaving through passage $k_6$ and pipe 28, by closing off the corresponding ports formed in the sleeve $b_6$. Calibrated scales or other means (not shown) are provided to enable the initial tension in the springs $h_6$ to be set to a desired value within their rating.

Figure 6:
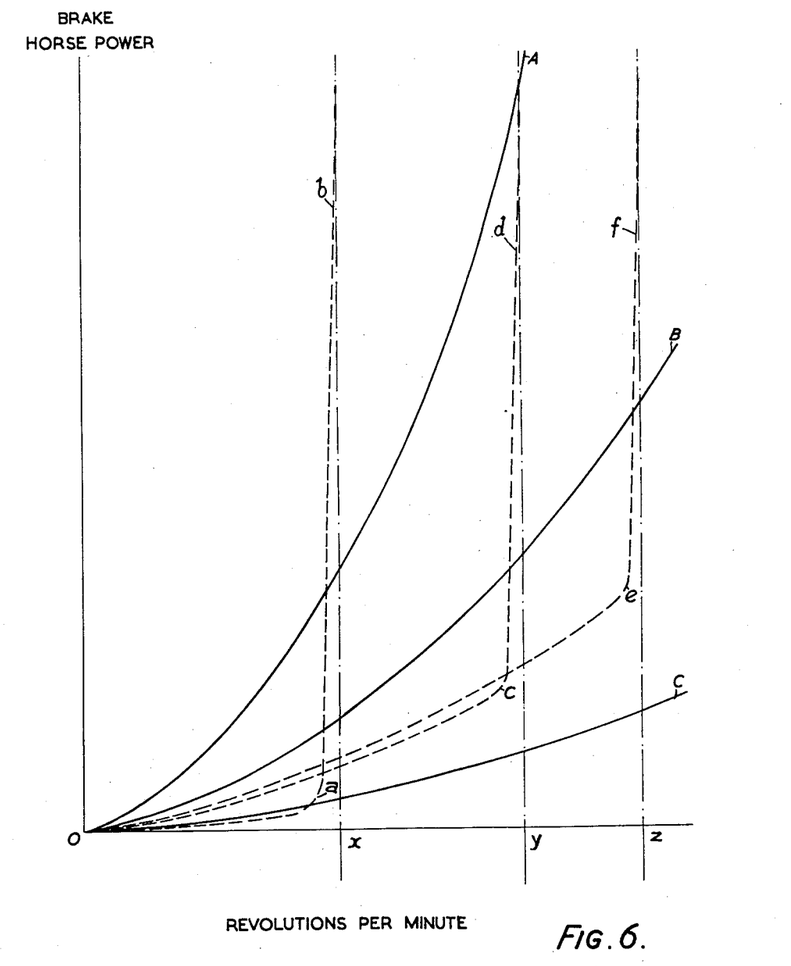
FIGURE 6 shows typical speed-load curves of a dynamometer.

In FIGURE 6 there are shown in full line three curves OA, OB and OC respectively showing the relationship between the speed in revolutions per minute and the brake horsepower absorbed by the dynamometer when the dynamometer is operating on a propeller law characteristic and the power absorbed varies approximately as the cube of the speed. The three curves OA, OB, and OC correspond respectively to three different settings of the propeller law needle valve 20.

Curves O$ab$, O$cd$, and O$ef$ shown in broken line in FIGURE 6 represent three typical speed-load characteristic curves obtainable by means of the present invention, each curve consisting of a first portion (O$a$, O$c$ or O$e$) which follows a propeller law i.e. a cube relation between load and speed, and then a steeply rising second portion ($ab$, $cd$, or $ef$) showing a practically constant speed over a large increase in power absorbed.

In operation of the dynamometer on propeller law characteristic the propeller law pump 7 delivers pressure oil through pipe 16, filter 17 and pipe 18 to port $f$ of the back pressure valve and by pressing its piston to the right (as viewed in FIGURE 2) tends to restrict the outflow of water through the ports 32 and 33 of the valve. For any one setting of the propeller law needle valve 20 the rate of pressure increase behind the back pressure valve piston $d$ will vary as the square of the dynamometer rotation speed and so also will the back pressure force exerted by the valve member $a$ on the water out-flowing through the dynamometer outlet 34. To secure cube law dynamometer horsepower characteristic the torque imposed must vary as the square of the rotational speed. Torque and casing pressure vary in direct proportion to each other and the casing pressure is in turn controlled by the applied back pressure at the outlet. Consequently, therefore, this part of the control system ensures the maintenance of propeller law absorption and represents an already existing state of the art. Adjustment of the needle valve 20 regulates the amount of pressure available to the left of piston $d$ at any fixed speed from maximum to minimum and permits absorption anywhere within the range of dynamometer capacity, for example as shown in FIGURE 6 at O$a$, O$c$ and O$e$ respectively.

Under these conditions, the constant speed needle valve 15 remains wide open and the piston $c_6$ of the constant speed valve 13 will be hard over to the left (as viewed in FIGURE 5) under the tension of the springs $h_6$ so that there will be free and unobstructed flow of oil from the propeller law needle valve through pipe 26, passages $j_6$ and $k_6$ of the constant speed valve, and pipe 28. Moreover, the oil leaving passage $f_5$ of the needle valve 20 and through pipe 26 and which is at low pressure is applied to the feeding port $m_1$ of the water inlet valve control 24.

It will be apparent from the foregoing that if the constant speed needle valve 15 is now partially closed, in order to operate the dynamometer on a constant speed characteristic, the resulting restriction will cause a rise of pressure between the discharge of the constant speed pump 6 and the partially closed port in sleeve $b_4$ of the needle valve 15. This increased pressure acting behind the piston $c_6$ of the constant speed valve 13 will not cause actual movement thereof until the force generated is just sufficient to overcome the force of the springs $h_6$, but when it does so there will be relatively rapid displacement of the piston $c_6$ to the right (as viewed in FIGURE 5). The speed (point $a$, $c$ or $e$, FIGURE 6) at which this occurs is controllable in two ways; firstly by the setting of the constant speed needle valve 15, and secondly by regulation of the tension of the springs $h_6$.

When the piston $c_6$ is displaced to the right it places in effect an additional restriction in the path of the oil flowing from the high pressure side of the back pressure valve piston $d$, through pipe 19, propeller law needle valve 20 and pipes 26 and 27 to the passage $j_6$ of the constant speed valve, and upon sufficient closure of the port fed from the passage $j_6$ overrides the action of the propeller law needle valve 20. This rapidly applied restriction in turn causes extra back pressure to be applied by the back pressure valve and a steep rise in dynamometer absorption (curves $ab$, $cd$, $ef$, FIGURE 6.)

The loading of the springs $h_6$ is so chosen that only a small increment of speed is sufficient to generate enough increase in control pressure to give very appreciable movement of the piston $c_6$; also the length of the port fed from passage $j_6$ is relatively short and hence the amount of displacement needed on $c_6$ to produce a large change of dynamometer load is also small.

Considering any one speed of rotation if the springs $h_6$ are set to give only moderate tension then only a small closure of the needle valve 15 will be necessary and the operating force to cause movement of the piston $c_6$ will be relatively small. For a low spring tension setting, the speed increment necessary to produce a given piston movement and valve port closure will be proportionately small. Conversely, from the same initial speed, if the springs are adjusted to a higher tension then the needle valve 15 will have to be closed to a greater extent so as to provide a larger piston operating pressure. In this case to produce the same pressure increment and piston movement the required dynamometer speed increase will be less. This arises due to the greater rate of increase of pump pressure in the second instance.

In this way, by adjustment of the tension of springs $h_6$ the steepness of the constant speeding characteristic may be regulated to a considerable degree. The actual speed at which the characteristic changes from propeller law to constant speed is determined by the setting of the constant speed needle valve.

During acceleration tests, it is often necessary to set the dynamometer for low power absorption for the initial part of the acceleration curve. The engine operates against propeller law characteristic as set by the appropriate needle valve, and to permit low power absorption the dynamometer water inlet supply may have to be reduced by adjustment of the motorised control apparatus 24. For the concluding part of the acceleration cycle, the constant speed characteristic is applied whereupon the power absorption increases and likewise the water quantity needed to achieve it. To cater for these rapidly varying water requirements, there is an automatic override provision on the water inlet valve 23 which is capable of admitting more water to the dynamometer at the commencement and during the constant speed part of the acceleration cycle.

Thus, when the piston $c_6$ of the constant speed valve 13 operates to increase back pressure as above described there is a rise in oil pressure in the pipes 26, 27 connecting the outlet passage $f_5$ of the propeller law needle valve 20 to the inlet passage $j_6$ of the constant speed valve 13. This rise in pressure is also communicated over pipe 26 to the port $m_1$ of the inlet valve control apparatus 24 and is effective in whole or in part on the piston $j_1$ which operates to rock the lever $c_1$ anti-clockwise as viewed in FIGURE 3. Anti-clockwise movement of the lever $c_1$ is transmitted by the lever $b_1$ to the valve member $a_1$ thereby to increase the opening of the ports $q_1$ to increase the quantity of water flowing into the dynamometer above that corresponding to the valve setting as determined by the motor 25. The extent to which this pressure rise may be admitted or broken down at the control apparatus 24 is determined by the setting of the hand-operated needle valves $o_1$, $p_1$ which regulate the degree of response of the piston $j_1$. For example, by closing $o_1$ and opening $p_1$ fully there is no response, and by reversing the setting, full line pressure is applied to the piston $j_1$.

We claim:

1. In the combination including an hydraulic dynamometer having an inlet for supplying water thereto and an outlet for discharging water therefrom, a back pressure valve connected to said outlet for variably adjusting the flow of water therethrough, thereby to impose back pressure on the water within the dynamometer, fluid pressure operable means operatively connected to the back pressure valve for actuating the back pressure valve to vary the said outlet flow of water, an operating fluid reservoir, pump means responsive to the speed of the dynamometer for developing a pressure in said operating fluid proportional to the speed of the dynamometer, means for delivering said pressurized operating fluid from said pump to the back pressure valve actuating means, and first valve means connected to the back pressure valve actuating means for controlling the supply of pressurized fluid to said valve actuating means to thereby impose a variable back pressure within said dynamometer such that the ratio between the power absorbed by the dynamometer and its speed of rotation follows a propeller law characteristic curve, the improvement which comprises second valve means connected to the back pressure valve operating means for further controlling the supply of pressurized fluid from said pump means to said valve actuating means, said second valve means being automatically effective upon the dynamometer exceeding a predetermined speed to cause the operation of the back pressure valve operating means and consequently of the back pressure valve to build up back pressure rapidly in response to any further increase in the speed of the dynamometer, thereby so increasing the ratio between the power absorbed by the dynamometer and its speed of rotation as to maintain the speed of the dynamometer substantially constant at the said predetermined speed.

2. The combination claimed in claim 1 comprising means controlling the actuation of said second valve means and the back pressure valve actuating means to vary the rate at which the ratio between the power absorbed by the dynamometer and its speed of rotation increases.

3. The combination claimed in claim 1 in which the said pump means develops a pressure which varies as the square of the dynamometer speed.

4. In the combination including an hydraulic dynamometer having an inlet for supplying water thereto and an outlet for discharging water therefrom, a back pressure valve connected to said outlet for variably adjusting the flow of water therethrough, thereby to impose back pressure on the water within the dynamometer, fluid pressure operable means operatively connected to the back pressure valve for actuating the back pressure valve to vary the said outlet flow of water, a supply system connected to said valve actuating means for supplying it with pressure fluid, and first control means in said supply system effective up to a predetermined speed of the dynamometer to control the supply of pressure fluid to said valve actuating means and thereby operate said valve to impose a variable back pressure such that the ratio between the power absorbed by the dynamometer and its speed of rotation follows a propeller law characteristic curve, the improvement which comprises second control means in said system for further controlling the supply of pressure fluid to said valve actuating means, said second control means being automatically effective upon the dynamometer exceeding a predetermined speed to cause the operation of the back pressure valve operating means and consequently of the back pressure valve to build up back pressure rapidly in response to any further increase in the speed of the dynamometer, thereby so increasing the ratio between the power absorbed by the dynamometer and its speed of rotation as to maintain the speed of the dynamometer substantially constant at the said predetermined speed.

5. The combination as claimed in claim 4, in which the said pressure fluid supply system comprises a first pump driven from the dynamometer shaft, an inlet and an outlet to said pump, means connecting the inlet of the pump to a fluid reservoir, means connecting the outlet of the pump to one side of the actuating means of the back pressure valve to cause the back pressure valve to exert a back pressure against the water flowing through the discharge outlet which varies as the square of the dynamometer speed, a control circuit hydraulically connecting one side of said actuating means to its opposite side, first and second independently adjustable regulating valves connected in series in said circuit, and hydraulic means for actuating said second regulating valve, together with control means comprising a second pump driven from the dynamometer shaft, an inlet and an outlet to said second pump, means connecting the inlet of said second pump to said fluid reservoir, and means connecting the outlet of the second pump through the hydraulic actuating means for said second regulating valve and through a third regulating valve to said reservoir, adjustment of said first regulating valve serving to determine the range of speed over which the back pressure valve is effective to exert back pressure, while adjustment of said third regulating valve determines the pressure which said second pump must deliver to actuate said hydraulically actuated regulating valve.

6. In the combination including an hydraulic dynamometer having an inlet for supplying water thereto and an outlet for discharging water therefrom, a back pressure valve connected to said outlet for variably adjusting the flow of water therethrough, thereby to impose back pressure on the water within the dynamometer, fluid pressure operable means operatively connected to the back pressure valve for actuating the back pressure valve to vary the said outlet flow of water, a supply system connected to said valve actuating means for supplying it with pressure fluid, and first control means in said supply system effective up to a predetermined speed of the dynamometer to control the supply of pressure fluid to said valve actuating means and thereby operate said valve to impose a variable back pressure such that the ratio between the power absorbed by the dynamometer and its speed of rotation follows a propeller law characteristic curve, the improvement which comprises second control means in said system for further controlling the supply of pressure fluid to said valve actuating means, said second control means being automatically effective upon the dynamometer exceeding a predetermined speed to cause the operation of the back pressure valve operating means and consequently of the back pressure valve to build up back pressure rapidly in response to any further increase in the speed of the dynamometer, thereby so increasing the ratio between the power absorbed by the dynamometer and its speed of rotation as to maintain the speed of the dynamometer substantially constant at the said predetermined speed, an adjustable inlet valve connected to said inlet for controlling the flow of water into the dynamometer, and pressure fluid means connected to said fluid pressure supply system for actuating said inlet valve and responsive to movements of said second control means to effect opening movement of said inlet valve to increase the flow of water into the dynamometer for increasing the power absorption in order to maintain said constant speed.

References Cited in the file of this patent

UNITED STATES PATENTS

| | | |
|---|---|---|
| 2,116,992 | Weaver | May 10, 1938 |
| 2,162,541 | Walker | June 13, 1939 |
| 2,421,056 | Dake et al. | May 27, 1947 |
| 2,632,301 | Brodie | Mar. 24, 1953 |
| 2,750,009 | Pohl | June 12, 1956 |
| 2,850,122 | Alishouse | Sept. 2, 1958 |
| 2,864,473 | Christensen | Dec. 16, 1958 |
| 2,956,406 | Peaster | Oct. 18, 1960 |

FOREIGN PATENTS

| | | |
|---|---|---|
| 466,436 | Great Britain | May 28, 1937 |
| 482,428 | Great Britain | Mar. 28, 1938 |